(12) United States Patent
Williams

(10) Patent No.: US 6,655,647 B1
(45) Date of Patent: Dec. 2, 2003

(54) REFERENCE MOUSE PAD

(76) Inventor: Danielle L. Williams, 70 Barons Rd., Rochester, NY (US) 14617

(*) Notice: Subject to any disclaimer, the term of this patent is extended or adjusted under 35 U.S.C. 154(b) by 81 days.

(21) Appl. No.: 10/072,028

(22) Filed: Feb. 7, 2002

(51) Int. Cl.[7] .................................................. A47B 91/00
(52) U.S. Cl. ..................... 248/346.01; 40/358; 345/163
(58) Field of Search ........................... 248/346.01, 918; D14/458; 428/343; 40/358, 649; 345/156, 163

(56) References Cited

U.S. PATENT DOCUMENTS

| | | | |
|---|---|---|---|
| D339,799 S | 9/1993 | Allen | |
| D361,326 S | 8/1995 | Schriner | |
| 5,542,637 A | 8/1996 | Schriner | |
| D376,791 S | 12/1996 | Schreiner | |
| D388,416 S | 12/1997 | Jones | |
| 5,696,536 A * | 12/1997 | Murphy | 248/346.01 |
| D392,955 S | 3/1998 | Wilson | |
| D395,876 S | 7/1998 | Afarian | |
| 5,779,211 A | 7/1998 | Bird | |
| D397,685 S | 9/1998 | Barrette | |
| D398,294 S | 9/1998 | Wilson | |
| 5,876,010 A | 3/1999 | Murphy | |
| 5,968,644 A | 10/1999 | Lai | |
| 5,971,340 A * | 10/1999 | Murphy | 248/346.01 |
| 6,070,845 A | 6/2000 | Herskovitz | |
| 6,322,033 B1 * | 11/2001 | Lee | 248/346.01 |
| 6,357,703 B1 * | 3/2002 | DiOrio | 108/69 |

* cited by examiner

Primary Examiner—Ramon O. Ramirez
(74) Attorney, Agent, or Firm—Donna P. Suchy, Esq.; Harter, Secrest & Emery LLP; Roger Ceto, Esq.

(57) ABSTRACT

A reference mouse pad provides data, which is accessible, when the mouse pad is opened. The reference mouse pad having a body made up of a cover and a base that are hinged together. The cover having a planar first mouse contacting surface and a planar second mouse contacting surface, the cover hingedly connected to the base an movable between a closed position exposing only the first mouse contacting surface and an open position exposing only the second mouse contacting surface contains a top surface on which the mouse is rolled on during use.

5 Claims, 4 Drawing Sheets

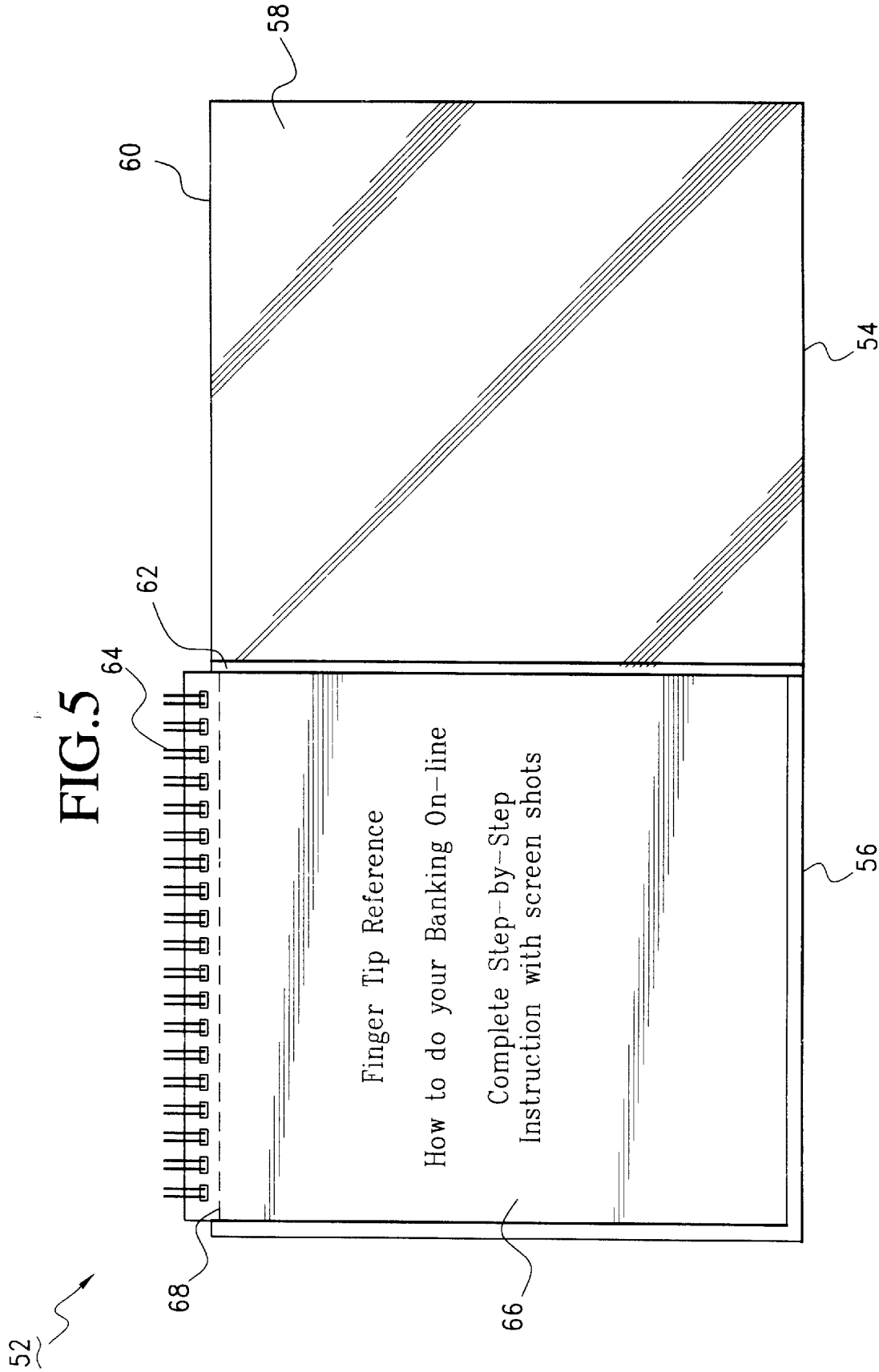

REFERENCE MOUSE PAD

FIELD OF THE INVENTION

This invention relates to a mouse pad for supporting a computer mouse and more particularly to a mouse pad containing reference data.

BACKGROUND OF THE INVENTION

The computer mouse is a well known accessory to certain types of computers that enables control of a cursor or similar software by a device, in the mouse such as a ball that rolls. It is generally controlled by the hand of the computer operator. A mouse generally can perform control functions in the computer and is generally placed on a support surface such as a desktop. It is an object of this invention to provide a mouse pad and a system for using that pad wherein the mouse pad contains reference data making it a reference source for specific functions.

SUMMARY OF THE INVENTION

In accordance with the above invention, a reference mouse pad provides data which is accessible when the mouse pad is opened. The reference mouse pad having a body made up of a first part and a second part that are hinged together. The first part contains a top surface on which the mouse is rolled on during use. The second part is hinged to the first part and contains reference data. The reference mouse pad is generally flat so that there is minimal thickness to the pad when it is in position to be used. In its preferred form the reference mouse pad is made up of material that permits the mouse to move across the surface and allows references to be incorporated in the second part.

BRIEF DESCRIPTION OF THE DRAWINGS

In the detailed description of the preferred embodiments of the invention presented below, reference is made to the accompanying drawings in which;

FIG. 5 is a detailed schematic view of another embodiment.

DETAILED DESCRIPTION OF THE INVENTION

Figure 1:
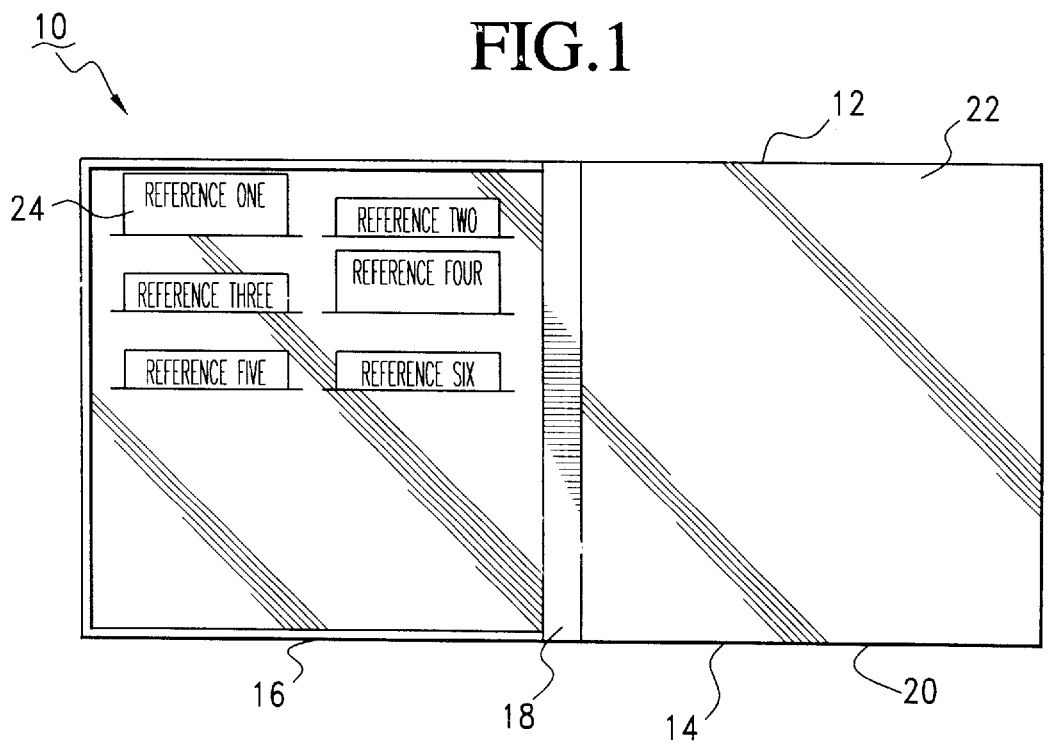
FIG. 1 is a schematic of a reference mouse pad in accordance with the invention.

The present description will be directed in particular to elements forming a part of, or in cooperation more directly with, the apparatus in accordance with the present invention. It is understood that elements not specifically shown or described may take various forms well known to those skilled in the art. Referring now to the drawings, like reference numerals represent similar or corresponding parts throughout several views.

FIG. 1 is a schematic diagram of a reference mouse pad 10. The reference mouse pad 10 consists of a body 12 that contains a mouse contacting cover, hereafter referred to as a first part 14, and a base, hereafter referred to as a second part 16. A hinge 18 connects the first part 14 to the second part 16 of the reference mouse pad 10.

Figure 2:
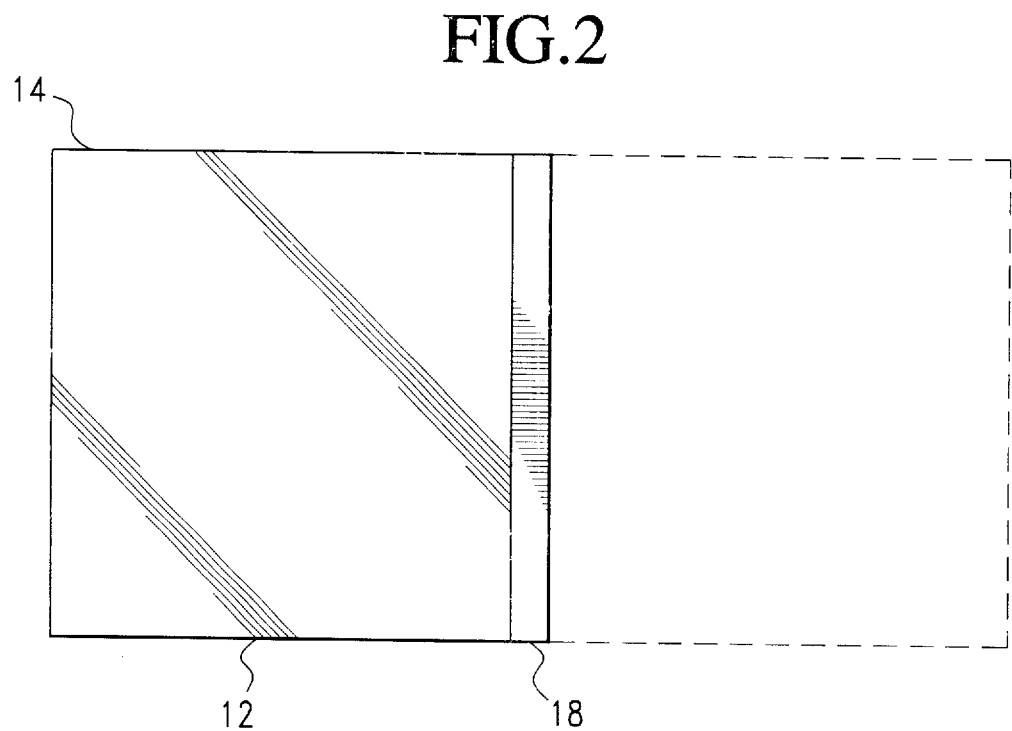
FIG. 2 is a schematic view of the top of the reference mouse pad.

The first part 14, as shown on FIG 1, having a planar first mouse contacting surface 20 and a planar second mouse contacting surface 22. The first part 14 hingedly connected to the second part 16 and movable between a closed position exposing only the first mouse contacting surface 20, hereafter referred to as the outer surface 20, and an open position exposing only the second mouse contacting surface 22, hereafter referred to as the inner surface 22. The hinge 18 hingedly connecting the first part 14 and the second part 16. The hinge 18 selected to dispose the first pan 14 in a horizontal orientation in the open position and a horizontal position in the closed position so that the mouse pad is flat in both positions to optimize use of the mouse. The outer surface 20 preferably made of a smooth material to permit easy and quick movement of the mouse across the outer surface 20 and the inner surface 22. FIG. 2 shows the outer surface 20 of the reference mouse pad 10. The hinge 18 is shown to the right of the body 12 of the reference mouse pad 10. This mouse pad in its preferred embodiment is intended for the right hand user. The pad sits to the right-hand side of the computer keyboard. To open the body 12 of the mouse pad the first part 14 will flip to the right as indicated by the dashed lines in FIG. 2. The user will find reference data when the first part 14 is flipped open.

Figure 3:
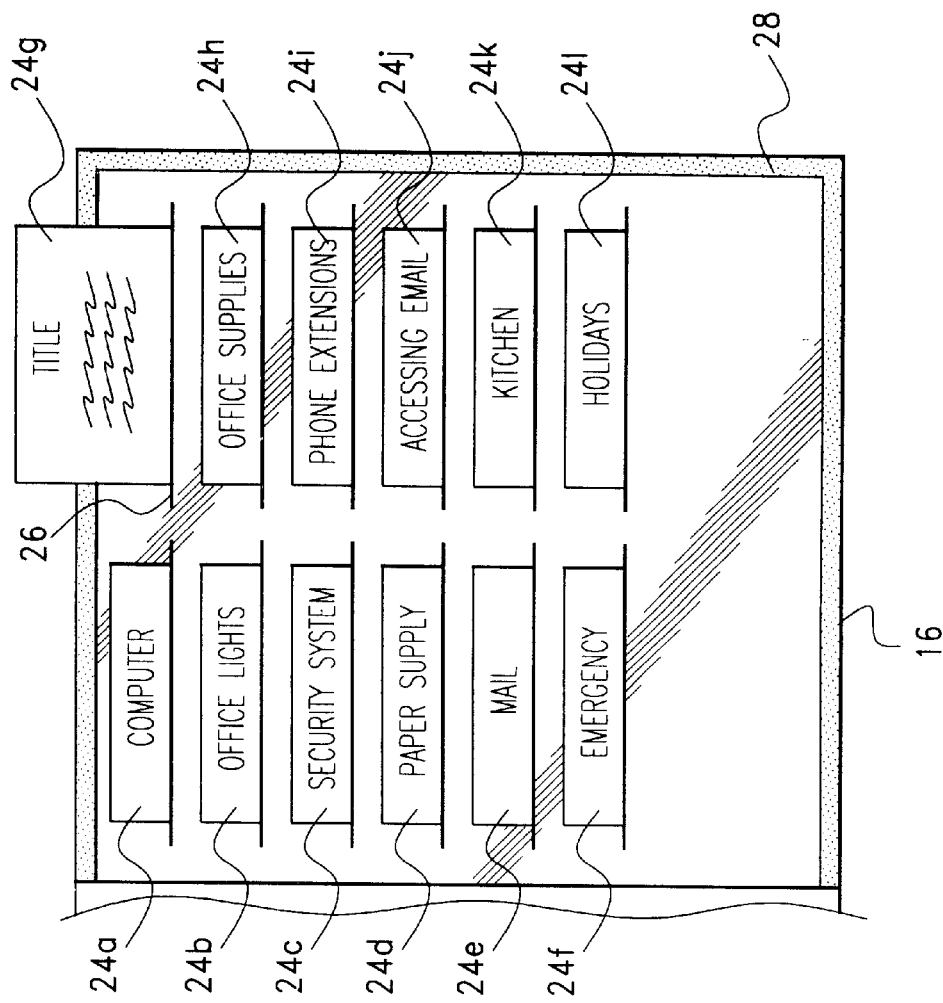
FIG. 3 is a detailed schematic view of the inside portion of the reference mouse pad.

FIG. 3 shows a schematic of the second part 16, of the reference mouse pad 10. The hinge 18 and the first part 14 of the reference mouse pad 10 are not shown in order to enable the second part 16 to be seen more clearly. The second part 16 of the computer reference mouse pad 10 has one or more reference data supports 24 shown as 24a–24l. Each reference data support 24 is capable of being inserted in a reference receiver shown as an opening 26 also known as a data support receiving slot, in the second part 16 of a reference mouse pad 10. The reference data support 24 contains reference data 27 including a title or additional data as shown in FIG. 3. The reference data 27 can be in either a machine readable or human readable format. Examples include printed instructions to complete a given task, visual images of items available for sale from a retailer, diskettes of data including audible references, or different scents such as various perfumes scents impregnated into the data support 24.

Also shown in FIG. 3 is a thick or raised strip 28, which is placed on three sides of the second part 16 to allow the first part 14 of the reference mouse pad to be even when closed over the second part 16. This strip can be made from a rubber strip, a molded plastic piece or simply a piece of tape since the dimensions of the reference data support 24 usually are minimal. It is not necessary to have this strip in all embodiments as would be clear to one skilled in the art. The second part 16 of the reference mouse pad surface is preferably rigid and of a non-stick open cell rubber or polyvinyl material similar to the first part. The reference data can be paper or plastic as is well known in the art.

Figure 4:
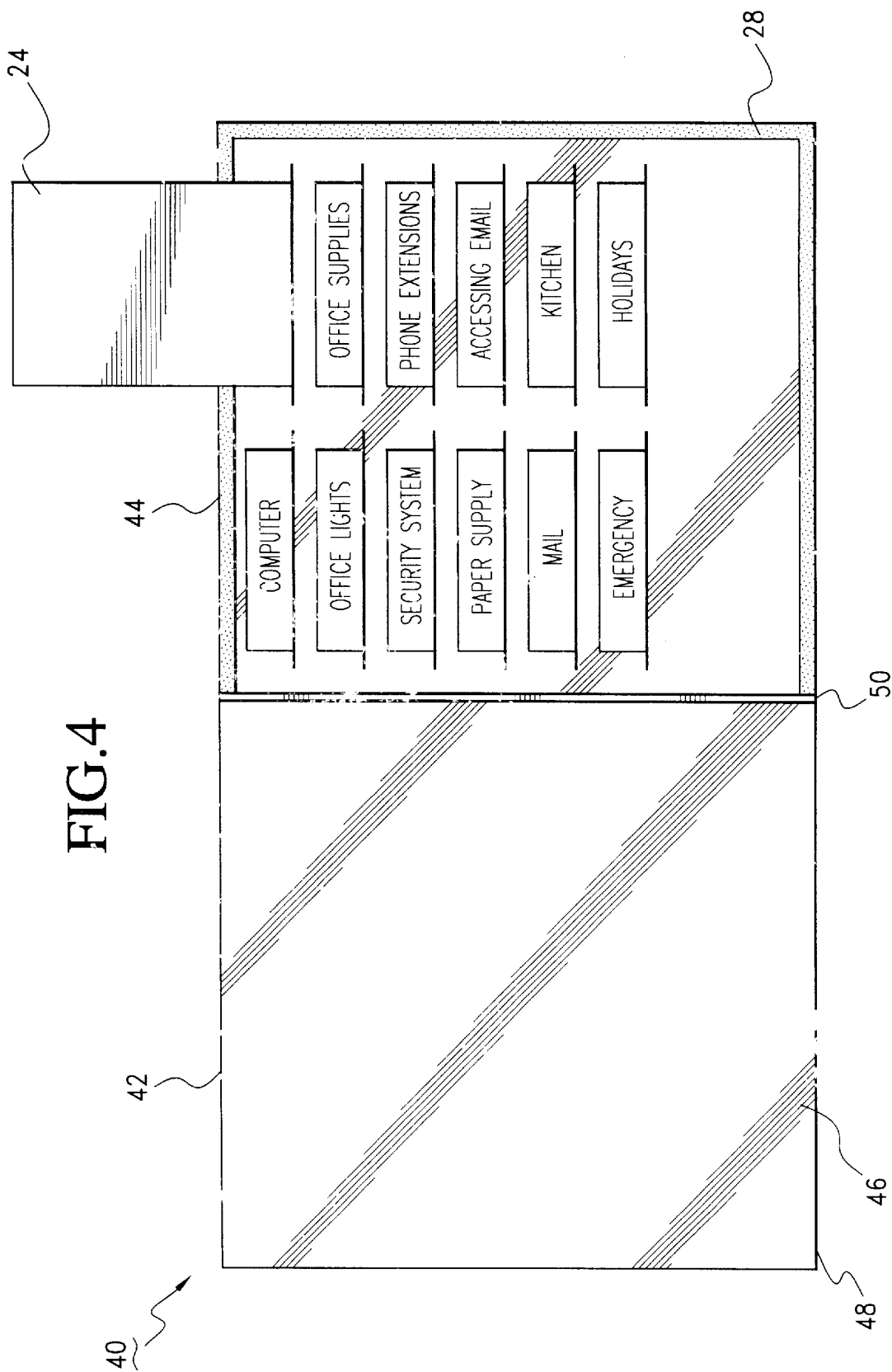
FIG. 4 is a detailed schematic view of another embodiment.

FIG. 4 shows embodiment of the reference mouse pad 40, made up a first part 42, and a second part 44, similar to the reference mouse pad described above. The first part has an inner surface 46 and an outer surface 48 which can be made of a smooth polyvinyl, an open cell rubber, or other material such as paper that has a thin plastic covering to serve as a smooth surface for the mouse pad to roll on. The first part 42 and the second part 44 can be hinged together with a hinge 50 that can consist of strong cloth binding tape, a mylar binding or other hinges as described above. In the reference mouse pad 40 the first part 42 is on the left hand side of the second part 44 to accommodate use by a left hand user. There are one or more reference data supports 24 similar to those described above. The second part 44 can have the strip 28 around the three sides of the mouse pad not encompassing the hinge 50 in order to enable a smooth fit when the first part 42 is closed on the second part 44. The reference mouse pads 10, 40 can both be made with open cell rubber so that a slit can be cut to insert the reference data support 24. For example, the reference data support 24 can be made from a 3"×4" card that may be laminated to slide more easily and for longer wear. The reference data supports 24 may overlap causing an uneven height and so the strip 28 is of a thickness to cause the first part 42 to close smoothly on the second part 44. The first part 44 and the second part 46 will be approximately the same size, for instance 6"×7.5", that will accept the reference data support 24 and yet be a suitable size to fit next to a computer.

The reference mouse pads 10, 40 above, can flip to reveal the reference data support 24 with some of the reference data 27, such as the title appearing. This invention is ideal for office procedures or other multi step-by-step instructions. The reference data support 24 can be removed or simply extended once the second part 16 is opened, thus making the material or instructions on the reference data support 24 accessible to a user of a particular program.

FIG. 5 shows another embodiment of the reference mouse pad 52 with a first part 54 and a second part 56. The first part has an inner surface 58 and an outer surface 60 such that the outer surface 60 and the inner surface 58 both have a suitable surface for the mouse pad to roll on.

The second part 56 can be made from open cell rubber or other materials as discussed above. The second part 56 is hinged to the first part 54 with a hinge 62 on either side, as discussed above. There is also a reference receiver shown as a reference hinge 64, which can be a plastic spiral coil, as shown, or other hinge materials as known in the art. This reference hinge 64 attaches one or more reference data supports 66 together such as that they are removable from to the second part 56 of the reference mouse lead 52. In the embodiment shown it is important that the reference hinge 64 be positioned such that the first part 54 can fit smoothly with the second part 56 to keep the mouse pad smooth and easy to close.

The reference data supports 66 can be laminated to make it easy to use. The reference data supports 66 can be inserted in an opening 68 in the second part 56 so that the reference data supports 66 are removable to allow easy access to the reference data 67. The reference mouse pad 52 preferably is 7 mm thick with the first part 54 being about 1 mm thick and the second part 56 being about 6 mm thick including the reference data support. A user can remove the reference data support 66, completely close the mouse pad and use the reference data as required before reinserting it back into its slot. Alternately the reference data supports 66 could be permanently affixed to the second part of the reference mouse pad 52.

This invention is ideal when graphic information is helpful, such as for online banking, retail sale information, software application quick tips and many more items. Specific examples of reference data 27 include on-line banking reference data to walk a user step-by-step through the online banking procedure making on-line banking readily accessible to those that are not familiar with a computer or the online banking options. It is also adaptable to payroll instructions for individuals entering payroll on line and for software instruction. The invention is also ideal for use by individual retailers of products to make commonly ordered items available by category. The mouse pad can serve as a marketing device and a reference device for a retailer.

The invention has been described in detail with particular reference to certain preferred embodiments thereof. It will be understood that variations in modifications can be affected within the spirit and scope of the present invention.

What is claimed is:

1. A reference mouse pad comprising:
   a) a base for resting on a flat horizontal support surface, the base having a perimeter of four edges and a flat horizontal upper surface containing at least one slot for releasably receiving an item of reference data;
   b) a cover hinge connected to the base along one edge, the cover being movable about the hinge connection between
      i) a horizontal closed position lying over the base upper surface so as to conceal the slot and item of reference data received in the slot, and
      ii) a horizontal open position resting flat on the support surface so as to expose the slot and any item of reference data received in the slot;
   c) the cover having flat inner and outer surfaces, the flat outer surface comprising a mouse pad surface useable only when the cover is in the horizontal closed position and the flat inner surface comprising a mouse pad surface usable only when the cover is in the horizontal open position lying fat on the support surface.

2. A reference mouse pad of claim 1, further comprising a strip on the base that is placed adjacent the edges not containing the hinge, the strip being raised to allow the cover to rest even over the base when in the horizontal closed position.

3. The reference mouse pad of claim 1 wherein the item of reference data includes a series of nested sheets hinged together on one side such that each is accessible in turn by flipping through the others and the whole is removable from the base.

4. The reference mouse pad of claim 1 wherein the item of reference data received in the slot contains machine readable or human readable data.

5. The reference mouse pad of claim 1 wherein the item of reference data received in the slot is selected from the group consisting of a printed instruction, a visual image and a diskette.

* * * * *

UNITED STATES PATENT AND TRADEMARK OFFICE
CERTIFICATE OF CORRECTION

PATENT NO. : 6,655,647 B1
DATED : December 2, 2003
INVENTOR(S) : Williams, Danielle L.

It is certified that error appears in the above-identified patent and that said Letters Patent is hereby corrected as shown below:

<u>Title page</u>,
Item [74], *Attorney, Agent, or Firm*, information reading "Ceto", should read
-- Aceto --.

<u>Column 4</u>,
Line 24, "b) a cover hinge" should read -- b) a cover hingedly --.
Line 27, "i) a horizontal closed position lying over" should read -- i) a horizontal closed position lying flat over --.

Signed and Sealed this

Second Day of March, 2004

JON W. DUDAS
*Acting Director of the United States Patent and Trademark Office*